(Model.)
2 Sheets—Sheet 1.
D. K. POMEROY.
CREAMER.
No. 276,460. Patented Apr. 24, 1883.
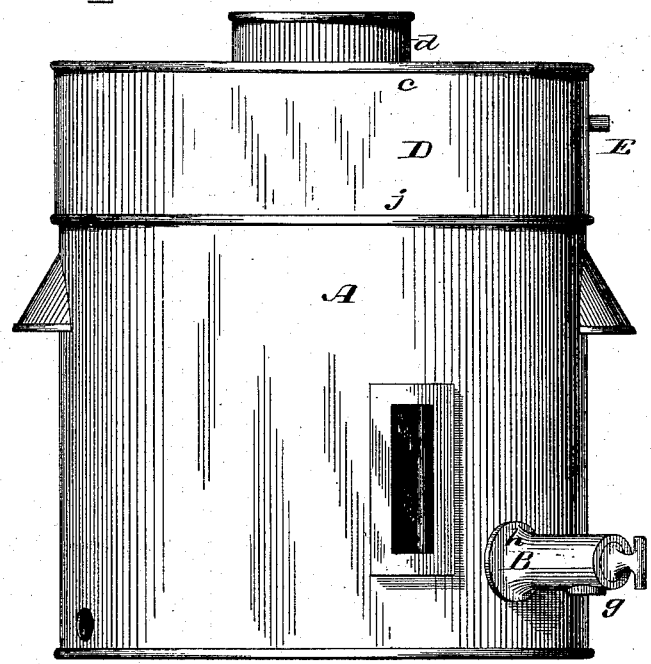
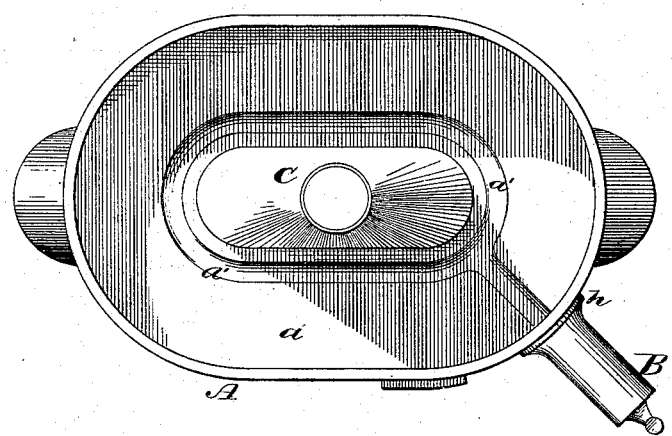
WITNESSES:
INVENTOR:

(Model.)
2 Sheets—Sheet 2.
D. K. POMEROY.
CREAMER.
No. 276,460. Patented Apr. 24, 1883.
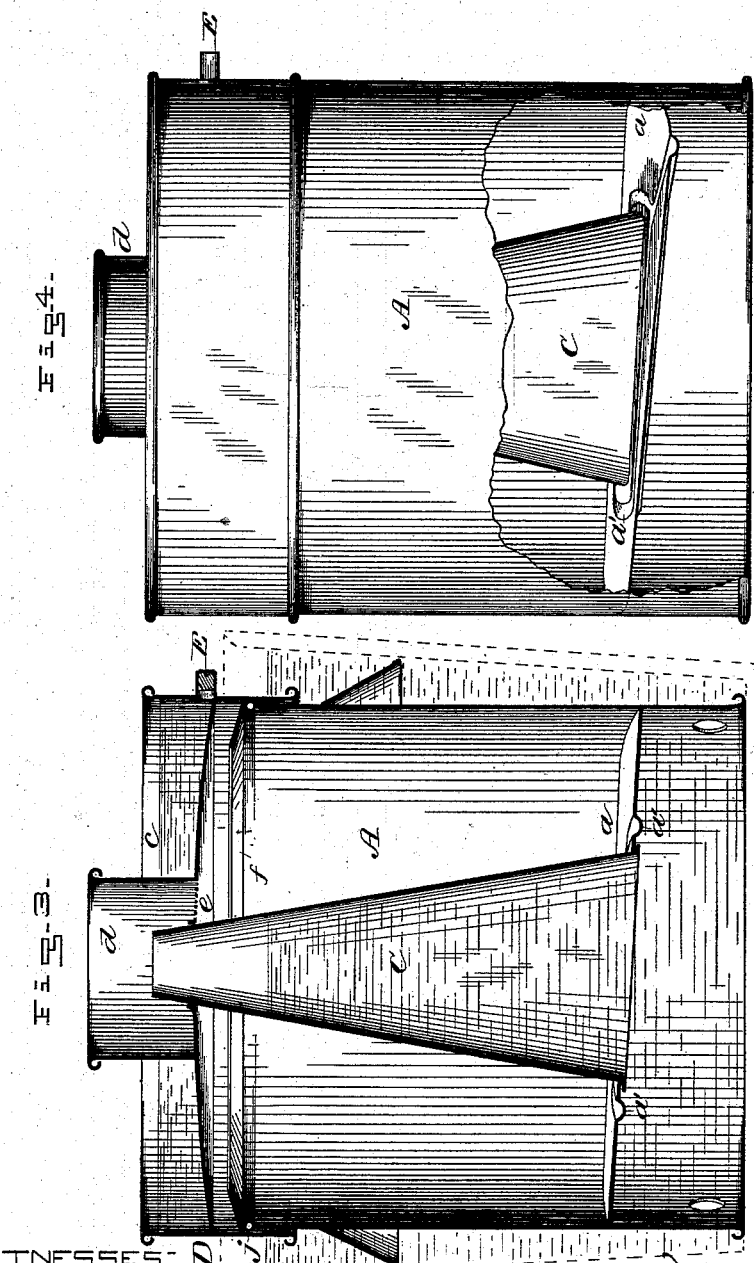

UNITED STATES PATENT OFFICE.

DANIEL K. POMEROY, OF OTTAWA, ONTARIO, CANADA.

CREAMER.

SPECIFICATION forming part of Letters Patent No. 276,460, dated April 24, 1883.

Application filed May 22, 1882. (Model.)

*To all whom it may concern:*

Be it known that I, DANIEL K. POMEROY, of Ottawa, in the Province of Ontario, Dominion of Canada, have invented certain Improvements in Creamers, of which the following is a specification.

My invention relates to creamers or cream-raising devices; and it consists in certain features hereinafter fully set forth.

In the accompanying drawings, Figure 1 represents a side elevation of the creamer complete; Fig. 2, a plan view of the same with the cover removed; Fig. 3, a vertical longitudinal section of the same; Fig. 4, a side elevation of the vessel with the wall broken away to show the bottom, and Fig. 5 an enlarged view of the faucet.

The present invention is designed to secure the more rapid rise of cream to the surface of the milk, to permit the vessel to be more readily and perfectly kept clean, and otherwise to improve the action of the creamer.

With these objects in view, the vessel A is made of an elliptical or flattened form in horizontal cross-section, as shown in Fig. 2, whereby the distance from one side wall to the other in a vessel of given capacity is rendered less than with other forms, and consequently the cooling effect of the water in which the vessel is immersed is better able to produce its effect through the whole body of milk, and the vessel can be packed with greater economy of space than cylindrical vessels. The side walls of the vessel A are perforated near the lower end, as in Fig. 1, and a bottom, *a*, is placed within the vessel at a suitable distance above said openings, as shown, said bottom being inclined both longitudinally and transversely to direct the flow of the vessel's contents to a delivery-opening, *b*; and to further insure such flow and the settlement of deposit or sediment and its delivery to the faucet B with the first discharge of contents, the bottom is formed with a channel or groove, *a'*, extending entirely around the central tube, C, and to the faucet B, as shown in Figs. 2 and 4, and the bottom is dished or depressed to cause the sediment to flow to said channel. Within the vessel, and extending from the bottom *a* to a point some distance above the top or cover D, is a tube, C, open at top and bottom, to permit the water in which the vessel is immersed to enter and rise therein, and to cool the body of milk from the center outward, as is now done in other creamers. At its lower end the tube C corresponds in cross-section to the contour of the vessel A, though considerably smaller than said vessel, to afford proper milk-space, and from the bottom it rapidly tapers to a comparatively small circular mouth at the top, as shown in Fig. 3. This form produces a much larger cooling-surface at the bottom than at the upper end of the tube, and consequently causes the cream particles or globules to rise more rapidly from the bottom of the milk than at higher points. The globules, in ascending, combine with those in their path, and the larger globules formed by their union rapidly ascend to the surface, and thus the separation of the cream and its rise to the surface is materially hastened.

The cover D is raised somewhat above the top of the body A to leave an air-space above the milk, which more effectually prevents the outside air from affecting the condition of the milk; and to still further protect the milk I form a water-receptacle on said cover by raising a rim or flange, *c*, around the outer edge of the cover and a similar flange or neck, *d*, around the inner opening, through which the tube C projects, the inner flange being made higher than the outer, so that the water, if from a running stream, may flow over the outer rim before rising high enough to pass over the inner neck or rim. An outlet-pipe, E, closed by a plug, is provided to allow water to be discharged from the cover or top. Within said inner rim or neck I form an opening, *e*, which I cover with wire-gauze, perforated metal, or other material which will exclude dust and dirt and yet allow the vapors to pass off from the milk.

It is well known that if the vapors be confined in the vessel or fail to pass off therefrom they condense on the under side of the top or on the walls, and form drops which detach themselves and fall back into the milk, producing an unpleasant flavor. To remedy this difficulty I make the top slightly arching in form, and place directly under its lower portion, whether at the center or at the side, a flange, cup, or receptacle to receive and hold said moisture. In the drawings this flange *f* is shown applied to the cover around the interior of its upright sides or walls, the cover being arched upward therefrom; but it is apparent that a cup may be applied, either permanently or detachably, to the central tube E, and the cover depressed at that point to cause the moisture to fall into said cup, or that a grooved rim may be detachably applied to the top of vessel A and arranged to project inward.

Considerable difficulty is now experienced in cleaning the cocks or faucets used with creamers or milk-coolers, owing to the curved form thereof and the practical impossibility of passing a cloth, brush, or other cleaning instrument into or through them. This difficulty I obviate by making the faucet B with a straight barrel, open at both ends, and having the closing-plug inserted from the outer end and arranged to close the barrel in rear of the delivery spout or mouth g, the plug being preferably threaded to screw into the barrel, as shown.

In order to produce a flush surface on the interior, and to give at the same time a firm support for the faucet, I cast the barrel of the latter with a flaring end, h, curved to conform to the contour of the exterior of the vessel, as shown in Fig. 2, and by this flaring end or flange I solder the cock to the vessel. This faucet is particularly designed and peculiarly adapted for use in creamers or milk-coolers, where absolute cleanliness is essential to good results.

By simply removing the plug a brush, cloth, or other cleaning-instrument can be passed entirely through the barrel of the faucet from end to end.

A strip of glass, mica, or other transparent material is placed in the wall of the vessel, near the faucet B, to show the line of separation between the cream and milk, or the height of the latter, as usual.

I am aware that oblong vessels have been made without the central tube, and that a slightly-conical tube is shown in a former patent, but with so slight a taper as to produce no practically beneficial result, and seemingly without special design or intention. The difference in size should be at least as two to one to produce any substantial benefit, and may be considerably greater.

The device, as a whole, is simple and cheap in construction, and will be found very efficient in use. It is designed to be placed in a tube or vessel containing water, and to have the water rise a little above the depending flange j of the cover to seal the same, as indicated.

Having thus described my invention, what I claim is—

The herein-described creamer, consisting of elliptical body A, having inclined bottom a, faucet B, and tube C, flattened on its lower end and tapering toward the top, and cover D, provided with flange f, as and for the purpose explained.

DANIEL K. POMEROY.

Witnesses:
WILLIAM W. DODGE,
WALTER S. DODGE.